US012403870B2

(12) United States Patent
Steinmann et al.

(10) Patent No.: US 12,403,870 B2
(45) Date of Patent: Sep. 2, 2025

(54) METHOD FOR DETECTING A RESISTANCE ON A BRAKE PEDAL PULLED BY AN ACTUATOR AND METHOD FOR CONTROLLING AN ACTUATOR

(71) Applicant: ZF Active Safety GmbH, Koblenz (DE)

(72) Inventors: David Steinmann, Weibern (DE); Dominik Schmidt, Boppard (DE); Patrick Wiedner, Koblenz (DE); Stefan Schmitz, Faid (DE); Andreas Hoehn, Dreikirchen (DE)

(73) Assignee: ZF ACTIVE SAFETY GMBH, Koblenz (DE)

( * ) Notice: Subject to any disclaimer, the term of this patent is extended or adjusted under 35 U.S.C. 154(b) by 275 days.

(21) Appl. No.: 17/964,087

(22) Filed: Oct. 12, 2022

(65) Prior Publication Data
US 2023/0111431 A1 Apr. 13, 2023

(30) Foreign Application Priority Data

Oct. 13, 2021 (DE) .......................... 102021126461.8

(51) Int. Cl.
*B60T 8/172* (2006.01)
*B60T 7/04* (2006.01)
*B60T 8/40* (2006.01)
*B60T 13/66* (2006.01)

(52) U.S. Cl.
CPC .............. *B60T 7/042* (2013.01); *B60T 8/172* (2013.01); *B60T 8/4077* (2013.01); *B60T 13/662* (2013.01)

(58) Field of Classification Search
None
See application file for complete search history.

(56) References Cited

U.S. PATENT DOCUMENTS

| 11,021,058 | B1* | 6/2021 | Kim .......................... G05G 5/28 |
| 2012/0074767 | A1* | 3/2012 | Nishio .................... B60L 50/16 303/3 |
| 2015/0028664 | A1* | 1/2015 | Choi ...................... B60T 13/745 303/3 |
| 2015/0260143 | A1* | 9/2015 | Yorke ................. F02N 11/0822 701/112 |
| 2015/0360666 | A1* | 12/2015 | Gerdes .................... B60T 11/18 60/545 |
| 2018/0039298 | A1* | 2/2018 | Adoline ................... G05G 5/03 |

(Continued)

FOREIGN PATENT DOCUMENTS

| DE | 19920850 A1 * | 5/2000 | ............ B60T 17/221 |
| DE | 19933517 A1 * | 5/2000 | .............. B60T 17/18 |

(Continued)

*Primary Examiner* — Jelani A Smith
*Assistant Examiner* — Jacob Daniel Underbakke
(74) *Attorney, Agent, or Firm* — ROSSI, KIMMS & McDOWELL LLP

(57) ABSTRACT

A method for detecting a resistance on a brake pedal of a brake system, in which a brake pedal is pulled by an actuator, in which an ease of movement of the brake pedal is determined during operation of the actuator, wherein a resistance is detected as soon as the ease of movement is no longer clearly determined, and a method for controlling an actuator, a computer program product, control unit or system comprising a plurality of control units, and a corresponding device.

12 Claims, 1 Drawing Sheet

(56) References Cited

U.S. PATENT DOCUMENTS

2018/0362000 A1* 12/2018 Jammes ................ B60T 13/662
2019/0381981 A1* 12/2019 Yoshida ............. B60T 8/17613

FOREIGN PATENT DOCUMENTS

| | | | | |
|---|---|---|---|---|
| DE | 10042536 A1 | * | 3/2002 | ................ B60T 7/06 |
| DE | 102006020304 A1 | * | 9/2008 | ............. B60T 7/065 |
| DE | 102018217566 A1 | * | 4/2020 | ............ B60W 40/09 |
| EP | 1707462 A1 | * | 10/2006 | ............. B60T 7/042 |
| JP | 2006281798 A | * | 10/2006 | ............. B60T 7/042 |
| JP | 2006281800 A | * | 10/2006 | |
| JP | 2008308097 A | * | 12/2008 | |
| KR | 20180068599 A | * | 12/2016 | |

\* cited by examiner

METHOD FOR DETECTING A RESISTANCE ON A BRAKE PEDAL PULLED BY AN ACTUATOR AND METHOD FOR CONTROLLING AN ACTUATOR

CROSS-REFERENCE TO RELATED APPLICATION

This application claims priority to German Priority Application No. 102021126461.8, filed Oct. 13, 2021, the disclosure of which is incorporated herein by reference in its entirety.

TECHNICAL FIELD

The disclosure relates to a method for detecting a resistance on a brake pedal of a brake system, which brake pedal is pulled by an actuator, in particular a brake booster, and a method for controlling an actuator. The disclosure furthermore relates to a corresponding computer program product, control unit and a corresponding device.

BACKGROUND

When executing external, in particular driver-independent, brake requests, the brake pedal is disengaged or moved forwards without intervention on the part of the driver. In this case, there is a risk that the brake booster will be damaged as a result of objects becoming jammed between the brake pedal and the vehicle floor. Furthermore, if part of the driver's body becomes trapped between the brake pedal and the vehicle floor, this may lead to serious injury.

SUMMARY

What is needed is to functionally improve a method mentioned at the outset, to structurally and/or functionally improve a computer program product mentioned at the outset and a control unit mentioned at the outset, and to structurally and/or functionally improve a device mentioned at the outset.

One method may be for detecting a resistance on a brake pedal of a brake system, wherein said brake pedal is pulled by an actuator. The method may be a method for monitoring and/or detecting the ease of movement of the brake pedal.

The brake system may be for a motor vehicle. The motor vehicle may be a car or lorry. The brake system may be a vehicle brake system and/or a motor-vehicle brake system. The actuator may be a brake booster. The brake booster may be an electric and/or electromechanical brake booster (Electronic Brake Booster, EBB).

In the method, an ease of movement of the brake pedal may be determined during operation of the actuator, A resistance may be detected as soon as the ease of movement is no longer—or no longer clearly—determined. The operation of the actuator may be triggered by a driver-independent and/or external brake request (EBR).

The ease of movement of the brake pedal may be understood as an undisrupted movement of the brake pedal and may be understood as an undisrupted swing or displacement of the brake pedal. The ease of movement of the brake pedal may no longer be realized if jamming of the brake pedal has occurred or a certain force, such as a damping force, is exceeded.

The ease of movement of the brake pedal may be determined by evaluating the force which acts on the brake pedal or on an input piston which is coupled or couplable to the brake pedal. The ease of movement of the brake pedal may be determined by evaluating the sum of all forces which act on the brake pedal or on the input piston which is coupled or couplable to the brake pedal. The force or the sum of all forces may be calculated or estimated.

The actuator may comprise the input piston (input rod). The actuator may be designed to move, for example to displace and/or to shift, the input piston. The actuator may comprise an actuating element, such as a rack. The actuating element of the actuator may be designed to move, for example to displace and/or to shift, the input piston. The actuator may comprise motors, such as an electric motor. The motor of the actuator may be designed to move, for example to displace and/or to shift, the actuating element, for example via a gear.

A position (xRack) and/or a travel, such as a displacement, (xRack) of the actuating element, such as a rack, of the actuator may be identified and/or estimated. A motor position signal of the motor, such as an electric motor, of the actuator may be received and/or—for example via a motor position sensor—acquired. The position and/or the travel of the actuating element of the actuator may be identified on the basis of the motor position signal. The actuator may comprise the motor position sensor. The position and/or the travel of the actuating element of the actuator may be an estimated position of the actuating element of the actuator.

A pedal travel (xPTSavg, PTSavg) and/or a pedal position (xPTSavg/PTSavg) of the brake pedal and/or the input piston, which is coupled or couplable to the brake pedal, may be identified. A pedal travel sensor signal, in particular of a pedal travel sensor, may be received and/or—in particular via the pedal travel sensor—acquired. The pedal travel and/or the pedal position may be identified on the basis of the pedal travel sensor signal. The actuator may comprise the pedal travel sensor. The pedal travel and/or the pedal position may be a measured position of the pedal travel sensor. The pedal travel sensor signal may be filtered. The filtering of the pedal travel sensor signal may take place for example via constant filtering. The pedal travel sensor signal may be corrected. The pedal travel sensor signal may be corrected for example by a predetermined error correction or by a correction algorithm.

The drag distance may be identified and/or received. The drag distance may be a distance or a relative travel between a pedal-travel-sensor connecting element (PTS Connector) and a housing element (ratio housing) or a spring element (DDFP-Spring), which is arranged between the pedal-travel-sensor connecting element and the housing element. The spring element may be a leaf spring or a disc spring. The spring element may designed to be displaceable along the input piston. The spring element may be mounted, for instance mounted in a floating manner, on the input piston, for example.

The drag distance may be processed and/or corrected. The drag distance may be subject to at least one correction, for example a first and/or second and/or third correction. The processing and/or correction of the drag distance may take place on the basis of an old/previous drag distance and/or a new/current drag distance and/or a minimum force, such as a minimum spring force. By processing and/or correcting the drag distance, it is possible to identify and/or obtain a corrected drag distance (Drag Distance Corrected).

The calculation of the force and/or the sum of all forces may be based on a model-based estimation of the force and/or the sum of all forces. The force and/or the sum of all forces may be determined via model-based estimation. The force and/or the sum of all forces may correspond substantially to a force (DFP Spring Force) and/or a force curve (DFP Spring Force) of the spring element which is arranged between the pedal-travel-sensor connecting element and the housing element. The force and/or the sum of all forces may be a clamping force and/or a clamping force curve. The force and/or the sum of all forces may be inferred from a compression of the spring element. The clamping force may be inferred from the compression of the spring element.

The model-based estimation may take place via an estimator, such as a force estimator (DFP, Spring Force Estimator). With the estimator, the force may be calculated and/or determined and/or estimated at a mechanical force sensor, such as a force sensor of the spring element. The model-based estimation may take place on the basis of a speed-dependent force component and/or a position-dependent force component. The sum of all forces acting on the brake pedal and/or on the input piston, which is coupled or couplable to the brake pedal, such as an acceleration force, spring force, friction force and/or tensile force cased by a fault, may be identified and/or estimated Input variables for the model-based estimation or the estimator may be the pedal travel (xPTSavg/PTSavg) and/or pedal position (xPTSavg/PTSavg) and/or the position (xRack) and/or the travel, such as a displacement, (xRack) of the actuating element of the actuator and/or the drag distance and/or the corrected drag distance (Drag Distance Corrected).

The speed-dependent force component may be based on a relative speed between the actuating element, such as a rack, of the actuator and the brake pedal and/or the input piston which is coupled or couplable to the brake pedal. The position-dependent force component may be based on a relative position between the position and/or the travel of the actuating element and the pedal travel and/or the pedal position, and/or on a spring characteristic of the spring element which is arranged between the pedal-travel-sensor connecting element and the housing element. The spring characteristic may be based on a relative travel and/or a relative position (x_DDFP_Spring) of the spring element. The relative travel and/or the relative position of the spring element may be corrected at least once, for example corrected twice. The force and/or the sum of all forces may be the estimated force of the spring element (DDFP Spring).

The evaluation of the force and/or the sum of all forces may take place via an evaluator (DFP Spring Force Investigator). The input variable for the evaluation and/or the evaluator may be the determined and/or the model-based estimation of the force and/or the sum of all forces (OFF Spring Force).

The evaluation of the force and/or the sum of all forces may take place on an, in particular empirically determined, reference force curve. The evaluation of the force and/or the sum of all forces may be based on a potentially averaged dynamic behaviour of the undisrupted system. The evaluation of the force and/or the sum of all forces may take place on the basis of a, for example temporally shifting, force evaluation window. The force evaluation window may comprise and/or define a plurality of force ranges, for example two, three, four or more force ranges. The evaluation of the force and/or the sum of all forces may take place taking into account dynamic and/or quasi-static force curves. The increase in force and/or the scanning step of the force, such as a OFF spring force, may be evaluated. A gradient evaluation may take place. The time during which the force, such as a OFF spring force, stays in a respective force range may be observed and/or evaluated.

The evaluation of the force and/or the sum of all forces and/or the determination of the ease of movement of the brake pedal and/or the detection of a resistance may take place using threshold values and/or threshold conditions, for example based on an overshooting or undershooting of threshold values. As soon as an overshooting of a defined threshold value and/or a defined threshold condition is determined, an ease of movement may no longer be present and/or determined—in particular no longer clearly so.

The ease of movement may be realised up to a defined force and/or up to a defined relative travel and/or relative position of the spring element. As soon as an overshooting of a defined force and/or a defined relative travel and/or relative position of the spring element is determined, an ease of movement may no longer be present and/or determined—in particular no longer clearly so.

A differential travel (xRk–Pts) between the position (xRk) and/or the travel (xRk) of the actuating element, such as a rack, of the actuator and the pedal travel (Pts) and/or the pedal position (Pts) of the brake pedal and/or the input piston, which is coupled or couplable to the brake pedal, may be determined.

The determination of the ease of movement of the brake pedal and/or the evaluation may take place via a frequency analysis, in particular with and/or within a time window.

The difference (xRk–Pts) between the position (xRk) and/or the travel (xRk) of the actuating element, such as a rack, of the actuator and the pedal travel (Pts) and/or the pedal position (Pts) of the brake pedal and/or the input piston, which is coupled or couplable to the brake pedal, may be subject to the frequency analysis. It may be determined whether the difference (xRk–Pts) is greater or smaller than the drag distance.

A frequency analysis of a differential travel signal may take place. The differential travel signal may be based on the motor position signal and the pedal travel sensor signal.

When determining the ease of movement of the brake pedal and/or during the evaluation and/or the frequency analysis, at least one Fourier transform, for example a discrete Fourier transform and/or a rapid Fourier transform, may be implemented and/or calculated and/or at least one Goertzel filter may be calculated and/or used. By way of example, two Fourier transforms and/or Goertzel filters may be implemented and/or calculated or used.

A plurality of values may be acquired over at least one time window. The acquired values may be analysed at the end of the at least one time window via frequency analysis. Alternatively, the frequency analysis may be implemented at each time step.

The determination of the ease of movement of the brake pedal and/or the evaluation and/or the detection of a resistance may be based on the result of the frequency analysis and/or take place using the result of the frequency analysis.

The ease of movement of the brake pedal may be monitored during the operation of the actuator, for example during an operation of the actuator which is triggered by a driver-independent and/or external brake request (EBR).

A free running system (ease of movement of the brake pedal) may be detected, for example within defined parameter fluctuations. As soon as a disrupted system is detected, a trigger/trigger signal may occur, for example for a safety system (Dynamic Driver Foot Protection, DDFP) and/or to control the actuator. This may remain active until an external trigger is set as a rest signal.

One method may be for controlling an actuator of a brake system of a motor vehicle. The actuator may be a brake booster. The actuator and/or the brake system may be designed as described above and/or below.

In the method, the movement of a brake pedal and/or an input piston, which is coupled or couplable to the brake pedal, may be prevented. The prevention may be realised during an operation of the actuator which is triggered by a driver-independent brake request. The prevention may be realized as soon as resistance on the brake pedal, which is pulled by the actuator, has been detected. The detection of the resistance may take place according to methods described above and/or below for detecting a resistance and/or for monitoring the ease of movement of the brake pedal. The prevention may be triggered by a trigger signal. The prevention may be realised via the control of the actuator.

At least part of the method, in particular for detecting a resistance and/or for controlling an actuator, may be stored as a computer program on a computer, microcomputer, in an electronic control and/or processing unit/device or on a storage medium and/or implemented thereon/therein. In terms of the software technology, the computer program may be distributed over one or more storage media, control and/or processing units/devices or computers etc.

A computer program product may prompt a device to execute the method described above and/or below, in particular to detect a resistance and/or to control an actuator. A computer program product may comprise program code in order to execute the method described above and/or below, in particular to detect a resistance and/or to control an actuator, when the computer program product is executed on a processor. A computer program product may prompt a device, such as a—for example electronic—control and/or a control and/or processing unit/device, a control system, a driver assistance system, a brake system, such as a vehicle brake system, a processor or a computer, to execute the method described above and/or below, in particular to detect a resistance and/or to control an actuator. To this end, the computer program product may comprise corresponding data sets and/or program code and/or the computer program and/or a storage medium for storing the data sets or the program.

A control unit or a system comprising a plurality of control units may be used in a motor vehicle. The brake system may comprise the control unit or the system comprising a plurality of control units.

The control unit or the system may be designed and intended for use in a motor vehicle. The control unit or the system may comprise an electronic control. The control unit or the system may be or comprise an electronic control unit (ECU). A plurality of control units may be provided. The plurality of control units may be connected and/or exchange data with one another via a bus system, for example a controller area network (CAN). The electronic control and/or the control unit or system may comprise a microcomputer and/or processor. The control unit or system may comprise one or more sensors and/or be connected thereto. The control unit or system may comprise the computer program product described above and/or below. The control unit or system may comprise a memory. The computer program product may be stored in the memory. The control unit or system may be designed to implement the method described above and/or below, in particular to detect a resistance and/or to control an actuator.

A device, such as a control unit, and/or a brake system may be designed and/or intended to implement the method described above and/or below, in particular to detect a resistance and/or to control an actuator.

In other words, a dynamic driver foot protection (DDFP) system may be provided, in which the ease of movement of a brake pedal may be detected and/or monitored during operation, taking into account the influences of dynamics, temperature, wear and/or manufacturing tolerances. The pedal force may be calculated, in particular using information (for example derived from different ignition changeover periods) which relates to relative positions of two components of the brake booster (EBB). Additionally or alternatively, a transient phenomenon may be distinguished from a static damping state via a frequency analysis of a differential signal. The analysis may be implemented by Goertzel filters or via a discrete Fourier transform.

Jamming of the brake pedal may be reliably detected according to the disclosure. Damage to the brake booster and injury to the driver may be prevented. Greater robustness may be achieved.

BRIEF DESCRIPTION OF DRAWINGS

Exemplary arrangements are described in more detail below, with reference to figures in which, schematically and by way of example.

DETAILED DESCRIPTION

Figure 1:
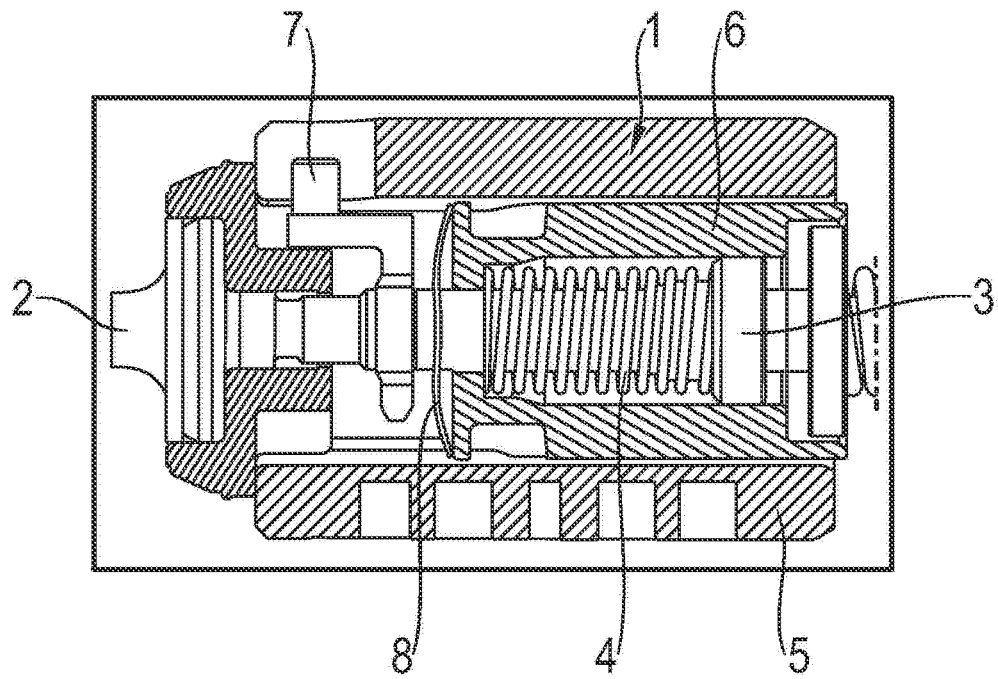
FIG. 1 shows the design and function of the mechanism or actuator.

FIG. 1 shows a schematic representation of the relevant design for dynamic driver foot protection (Dynamic Driver Foot Protection System) and the function of the mechanism or actuator 1 for detecting a resistance on a brake pedal of a brake system, which brake pedal is pulled by the actuator 1.

The actuator 1 is designed as an electromechanical brake booster 1 (EBB) and is illustrated in a starting position (rest position) in FIG. 1. An ease of movement of the brake pedal may be determined during operation of the actuator 1, wherein a resistance is detected as soon as the ease of movement is no longer clearly determined.

The actuator 1 comprises an output piston 2 (output rod), which is coupled to a primary piston of a master brake cylinder (not illustrated). The actuator furthermore comprises an input piston 3 (input rod), which is coupled to the brake pedal, for example via a lever-type gear (not illustrated).

The input piston 3 is held in a dead-centre position by the pressure force of a spring 4 (input rod spring) and the support on the housing of the actuator 1. The actuator 1 furthermore comprises an actuating element 5 in the form of a rack 5, which is in contact with the housing 6 (ratio housing), which receives the input piston 3. The actuating element 5 and the housing 6 may be held in the dead-centre position by the pre-tensioning forces of the spring configuration (not shown), which acts on the output piston 2 from the left-hand side, and a defined motor torque of a motor of the actuator. The dead-centre position is highly dependent on temperature, tolerances and wear and may be identified at almost every ignition changeover in an initialisation routine.

In the rest position (shown in FIG. 1) of the actuator 1, the maximum relative travel can be seen between the housing 6 and a pedal-travel-sensor connecting element 7 (PTS Connector). This relative movement is divided into two components, the relative travel Drag Distance and the relative travel (x_DDFF_Spring) of a spring element 8 which is mounted in a floating manner (DDFP-Spring). The relative travel Drag Distance is between the pedal-travel-sensor connecting element 7 and the spring element 8 which is mounted in a floating manner (DDFP-Spring). The relative travel x_DDFF_Spring is between one side of the spring element 8 and the housing 6. This represents the compression travel of the spring element 8 and forms an input variable for calculating an associated force, such as a spring force (DOFF-Spring-Force).

In an application which involves a driver-independent braking procedure (EBR), a force on the actuating element 5 of the actuator 1 is generated according to the transmitted volume flow request, which force displaces the actuating element 5 (to the left in FIG. 1). The housing 6, which is in contact with the actuating element 5, is pulled along at the same time. In this case, the housing 6 displaces the spring element 8, which is mounted in a floating manner, on the input piston 3 until this spring element abuts against the pedal-travel-sensor connecting element 7. The spring element 8 is then compressed between the housing 6 and the pedal-travel-sensor connecting element 7 during the continuing displacement until a force equilibrium is established between the spring element 8 and the spring 4 of the input piston 3. This force equilibrium centers the input piston 3 in the housing 6 in a quasi-static manner.

Due to the low damping coefficient of the associated guideway and high inertia of the coupled pedal, vibrations are to be expected during a free movement (without a tensile force acting on the pedal). This alters the two relative travels Drag Distance and the relative travel of the spring element 8 (x_DDFP_Spring). This latter serves for calculating and evaluating the time-varying force of the input piston 3 or the brake pedal depending on the drag distance. It is thus possible to make a reliable statement about the ease of movement of the brake pedal.

Figure 2:
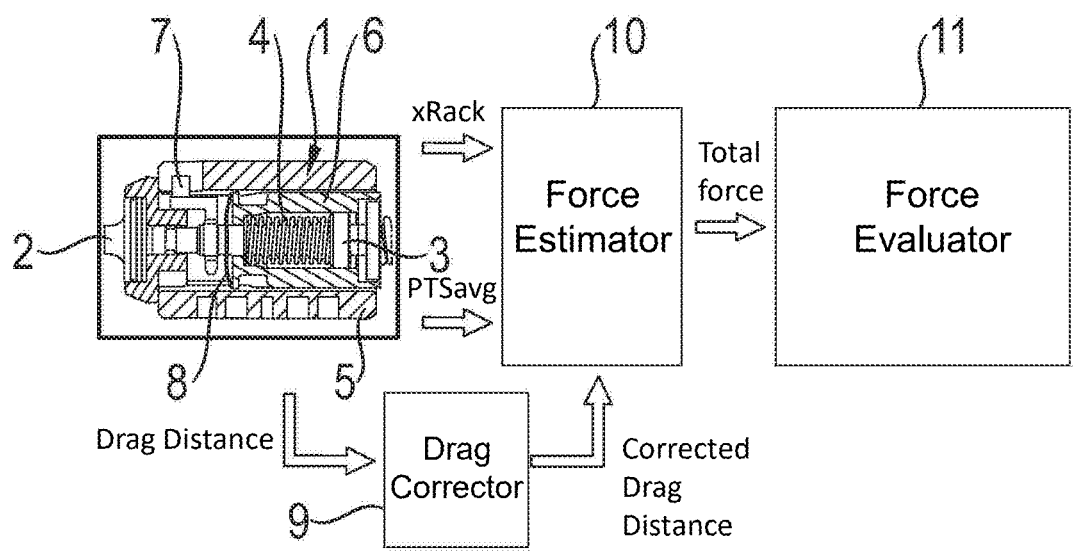
FIG. 2 shows the design and function of the algorithm in a schematic representation.

FIG. 2 shows a schematic representation of the design and function of the algorithm with which the sum of all forces on the brake pedal may be calculated and evaluated.

To this end, a purely mechanical force sensor in the form of the spring element 8 (DDFP-Spring) is integrated in the load path from the actuating element 5 of the actuator 1 to the brake pedal, which spring element outputs or provides a relative deviation and/or position signals as a consequence of a force effect. Using these position signals, a tensile force with a defined value, which acts on the brake pedal, may be promptly detected so that it is possible to prevent a continuing forwards movement of the brake pedal, which would lead to an overshooting of a defined force limit. The algorithm or the method operates according to the basic principle of observing a free running pedal so long as no flag is set.

The coupled sensors for acquiring the motor position of the motor, such as an electric motor, the actuator 1 and the pedal travel deliver the required input signals directly or indirectly. It may be necessary to process the pedal travel (PTSavg) using routines. The processing may be realized by filtering and/or correcting the pedal travel sensor signal. Constant filtering and/or a correction algorithm may be used.

The identification of the precise rack position (xRack) may take place on the basis of the motor position sensor signal.

The information relating to the drag distance may be provided. The drag distance may be subject to processing, which is performed in the subsystem Drag Distance Correction 9. The output variable in the form of the corrected processed signal is denoted by CorrectedDragDistance or Corrected Drag Distance.

The three signals xRack, PTSavg and CorrectedDragDistance may collectively form the input variables of a force estimator 10 (DFP Spring Model). Taking into account the kinematics of the mechanism, the calculation of the force (DFP_Spring_Force), which acts on the input piston and therefore on the brake pedal, may take place.

This calculated force or force curve may form the input variable of the subsystem Evaluator 11 (DFP Spring Force Investigator) and therefore forms the evaluation basis for a free running pedal. As soon as the ease of movement may no longer be clearly detected and therefore a resistance is or has been detected, a DDFP flag may be set in this subsystem and it is thus possible to activate the dynamic driver foot protection and/or control the actuator accordingly.

In the method for detecting a resistance on the brake pedal which is pulled by the actuator 1, an ease of movement of the brake pedal may therefore be determined during operation of the actuator 1, wherein a resistance is detected as soon as the ease of movement is no longer clearly determined. Then, in the method for controlling the actuator 1, during the operation of the actuator 1, which is triggered by a driver-independent brake request, the movement of the brake pedal and/or the input piston 3, which is coupled or couplable to the brake pedal, may be prevented as soon as a resistance on the brake pedal, which is pulled by the actuator 1, is or has been detected. The method for detecting a resistance and/or for controlling the actuator 1 may be and/or implement the dynamic driver foot protection.

Moreover, in addition, please refer in particular to FIG. 1 and the associated description.

"May" is used in particular to refer to optional features in the disclosure. Consequently, there are also developments and/or exemplary arrangements in the disclosure which additionally or alternatively have the respective feature or the respective features.

Isolated features may also be extracted as required from the feature combinations disclosed in the present case and, by eliminating a second structural and/or functional connection which is possibly present between the features, may be used in combination with other features to define the subject matter of a claim. The sequence and/or number of steps of the method may be varied. The methods may be combined with one another, for example to create an overall method.

The invention claimed is:

1. A method for detecting a resistance on a movement of a brake pedal of a brake system when the brake pedal is pulled by an actuator in response to a brake request from a driver independent brake system, the method comprising:
measuring a position or a travel of an actuating element of the actuator during the movement of the brake pedal;
measuring a position or travel of the brake pedal or an input piston coupled to the brake pedal during the movement of the brake pedal;
calculating a position dependent force component acting upon the brake pedal based on the measured position or travel of the actuating element and the measured position or travel of the brake pedal or the input piston coupled to the brake pedal, the position dependent force component defining a tensile force operating on the brake pedal, wherein the tensile force is below a predefined threshold in the absence of the resistance on the movement of the brake pedal:
measuring a relative speed between the movement of the actuating element and the movement of the brake pedal or the input piston coupled to the brake pedal;
calculating a speed dependent force component acting upon the brake pedal based on the measured relative speed between the movement of the actuating element and the movement of the brake pedal or the input piston coupled to the brake pedal, the speed dependent force component corresponding to a change in acceleration of the movement of the brake pedal in the presence of the resistance on the movement of the brake pedal;

calculating a total force acting upon the brake pedal based on the calculated position dependent force and the calculated speed dependent force during a time period when the brake pedal is pulled by the actuator in response to the brake request from the driver independent brake system; and detecting the resistance on the movement of the brake pedal during an operation of the actuator in response to the total force exceeding a predefined threshold.

2. A method according to claim 1, wherein the actuating element is a rack of the actuator.

3. A method according to claim 2,
wherein a motor position signal of a motor of the actuator is received or acquired via a motor position sensor, and
wherein the position or the travel of the actuating element of the actuator is measured on the basis of the motor position signal.

4. A method according to claim 1,
wherein a pedal travel sensor signal is received or acquired via a pedal travel sensor, and
wherein the travel or the position of the brake pedal or the input piston is measured on the basis of the pedal travel sensor signal.

5. A method according to claim 4, wherein the pedal travel sensor signal is filtered via constant filtering or corrected via a predetermined error correction or a correction algorithm.

6. A method according to claim 1,
wherein a drag distance is identified or received, and
wherein the drag distance is a distance or a relative travel between a pedal-travel-sensor connecting element and a housing element or between the pedal-travel-sensor connecting element and a spring element arranged between the pedal-travel-sensor connecting element and the housing element.

7. A method according to claim 1, wherein the calculation of the total force is based on a model-based estimation of the total force.

8. A method according to claim 1, wherein the total force corresponds substantially to a force or a force curve of a spring element arranged between a pedal-travel-sensor connecting element and a housing element.

9. A method according to claim 1, wherein the total force is evaluated using a temporally shifted force evaluation window taking into account dynamic or quasi-static force curves.

10. A method according to claim 1, wherein the detection on the resistance of the movement of the brake pedal place via a frequency analysis of a temporally shifted force curve of the total force with a time window.

11. A method for controlling an actuator of a brake system of a motor vehicle during an operation of the actuator triggered by a driver-independent brake request, the method comprising:

measuring a position or travel of an actuating element of the actuator during the movement of the brake pedal;

measuring a position of the brake pedal or an input piston coupled to the brake pedal during the movement of the brake pedal;

calculating a position dependent force component acting upon the brake pedal based on the measured position or travel of the actuating element and the measured position of the brake pedal or the input piston coupled to the brake pedal, the position dependent force component defining a tensile force operating on the brake pedal, wherein the tensile force is below a predefined threshold in the absence of the resistance on the movement of the brake pedal;

measuring a relative speed between the movement of the actuating element and the movement of the brake pedal or the input piston coupled to the brake pedal;

calculating a speed dependent force component acting upon the brake pedal based on the measured relative speed between the movement of the actuating element and the movement of the brake pedal or the input piston coupled to the brake pedal, the speed dependent force component corresponding to a change in acceleration of the movement of the brake pedal in the presence of the resistance on the movement of the brake pedal;

calculating a total force acting upon the brake pedal based on the calculated position dependent force and the calculated speed dependent force during a time period when the brake pedal is pulled by the actuator in response to the brake request from the driver independent brake system;

detecting the resistance on the movement of the brake pedal during an operation of the actuator in response to the total force exceeding a predefined threshold; and preventing the movement of the brake pedal or the input piston coupled to the brake pedal when the resistance on the brake pedal pulled by the actuator is detected.

12. A non-transitory computer readable storage medium that stores processor executable program code to implement a method for detecting a resistance on a movement of a brake pedal of a brake system when the brake pedal is pulled by an actuator in response to a brake request from a driver independent brake system, the method comprising:

measuring a position or travel of an actuating element of the actuator during the movement of the brake pedal;

measuring a position of the brake pedal or an input piston coupled to the brake pedal during the movement of the brake pedal;

calculating a position dependent force component acting upon the brake pedal based on the measured position or travel of the actuating element and the measured position of the brake pedal or the input piston coupled to the brake pedal, the position dependent force component defining a tensile force operating on the brake pedal, wherein the tensile force is below a predefined threshold in the absence of the resistance on the movement of the brake pedal;

measuring a relative speed between the movement of the actuating element and the movement of the brake pedal or the input piston coupled to the brake pedal;

calculating a speed dependent force component acting upon the brake pedal based on the measured relative speed between the movement of the actuating element and the movement of the brake pedal or the input piston coupled to the brake pedal, the speed dependent force component corresponding to a change in acceleration of the movement of the brake pedal in the presence of the resistance on the movement of the brake pedal;

calculating a total force acting upon the brake pedal based on the calculated position dependent force and the calculated speed dependent force during a time period when the brake pedal is pulled by the actuator in response to the brake request from the driver independent brake system; and detecting the resistance on the movement of the brake pedal during an operation of the actuator in response to the total force exceeding a predefined threshold.

\* \* \* \* \*